United States Patent
Weitz et al.

[11] Patent Number: 5,983,852
[45] Date of Patent: Nov. 16, 1999

[54] STATIC SEAL FOR INTERNAL COMBUSTION ENGINES, IN PARTICULAR CLOSURE COVER FOR CRANKSHAFT AND GEARBOX HOUSINGS

[75] Inventors: Klaus-Peter Weitz, Hilden; Helmut Olbricht, Wuppertal, both of Germany

[73] Assignees: Ford-Werke Aktiengesellschaft, Koln, Germany; CR Elastomoere GmbH, Leverkusen, Germany

[21] Appl. No.: 09/011,238

[22] PCT Filed: Jul. 30, 1996

[86] PCT No.: PCT/DE96/01446

§ 371 Date: Oct. 15, 1998

§ 102(e) Date: Oct. 15, 1998

[87] PCT Pub. No.: WO97/05374

PCT Pub. Date: Feb. 13, 1997

[30] Foreign Application Priority Data

Aug. 2, 1995 [DE] Germany ............. 195 28 379

[51] Int. Cl.$^6$ ............................................. F02F 7/00
[52] U.S. Cl. ................................. 123/198 E; 123/195 C
[58] Field of Search ............... 123/195 C, 198 E; 277/408, 562, 627, 648, 564, 650, 592, 598, 935, 936

[56] References Cited

U.S. PATENT DOCUMENTS

| | | | |
|---|---|---|---|
| 4,050,700 | 9/1977 | Lifferth | 277/72 FM |
| 4,265,495 | 5/1981 | Backlin | 123/195 C |
| 4,508,072 | 4/1985 | Takami et al. | 123/198 E |
| 4,688,752 | 8/1987 | Barteck et al. | |
| 4,799,691 | 1/1989 | Stritzke et al. | 123/198 E |
| 4,846,482 | 7/1989 | Blodgett et al. | 123/198 E |
| 4,928,980 | 5/1990 | Deuring | 123/198 E |
| 5,152,538 | 10/1992 | Mims | 123/198 E |
| 5,329,898 | 7/1994 | Nelson et al. | 123/195 C |

FOREIGN PATENT DOCUMENTS

| | | |
|---|---|---|
| 36 34 735 | 6/1989 | Germany . |
| 39 27 340 | 10/1990 | Germany . |
| 39 27 341 | 10/1990 | Germany . |
| 42 24 995 | 12/1993 | Germany . |

*Primary Examiner*—Willis R. Wolfe
*Assistant Examiner*—Jason Benton
*Attorney, Agent, or Firm*—Burns, Doane, Swecker & Mathis, L.L.P.

[57] ABSTRACT

A housing cover for sealing a crankshaft housing includes a metal body having an end face adapted to face the flange surface on the crankshaft housing, with the metal body being provided with a plurality of holes for receiving attachment screws for attaching the housing cover to the crankshaft housing. A sealing strip is attached to the end face of the metal body. The sealing strip possesses an end face that is adapted to face the flange surface on the crankshaft housing. The end face of the sealing strip is configured to define at least one recess in the sealing strip, and a sealant is provided in the recess.

20 Claims, 1 Drawing Sheet

STATIC SEAL FOR INTERNAL COMBUSTION ENGINES, IN PARTICULAR CLOSURE COVER FOR CRANKSHAFT AND GEARBOX HOUSINGS

FIELD OF THE INVENTION

The invention relates to a static seal for combustion engines, in particular covers for crankshaft and gear housing, consisting of a basic body made from metal, etc. and provided with holes for holding attachment screws, as well as sealing strips of an elastomer material attached on it by means of, e.g. vulcanization, etc., whereby these sealing strips are provided with at least one axially projecting link.

BACKGROUND OF THE INVENTION

Such seals are used for the releasable, fluid-tight attachment of housings, such as oil pans or valve covers, on the engine block, or for covers of crankshaft and gear housings. When sealing a crankshaft housing, the housing cover consists of a dynamic seal for the crankshaft extending through the cover, whereby the dynamic seal consists of at least one, possibly spring-loaded, elastic sealing lip that has been attached by vulcanization, as well as two flange surfaces that meet each other at an angle of usually 90 degrees and that must be statically sealed, and of which one extends radially to the crankshaft housing and is used for the tight connection with the crankshaft housing, and the other extends in the crankshaft axial direction and is provided for the tight connection with the oil pan, whereby sealing strips that project from the flange surfaces are provided for the static sealing of both flange surfaces in the crankshaft axial direction or radially in relation to it.

DE-PS 36 34 735 introduces a housing cover consisting of a sheet metal body drawn in bowl shape which, for the purpose of sealing the crankshaft, is provided with a dynamically loaded sealing ring of an elastomer material, as well as statically acting sealing strips, also made from an elastomer material, which merge with each other to form one piece. A sealing strip exiting from the axial flange surface is used for sealing the oil pan which can be screwed in from the bottom against the crankshaft housing. Two nuts are welded into the housing cover so that during the unscrewing of the oil pan the sealing strip between the housing cover and the oil pan can be pressed together with an adequate superficial pressure in order to create the seal.

A flawless seal requires that the surfaces of the housing surfaces opposite from the sealing strip are highly accurate, which has a great effect on manufacturing and processing costs. Special requirements for a perfect seal are hereby posed not only by the macro-irregularities of the surfaces, but also by micro-roughnesses, pores, step transitions, etc. In addition, heat fissures and furrows may occur over time on the sealing strips during operation, which may result in a long-term deterioration of the sealing effect.

SUMMARY OF THE INVENTION

The invention is based on the objective of improving a seal according to the claims in such a way that on the one hand the finishing costs for the countersurfaces can be significantly reduced, or no finishing is necessary at all, and on the other hand the sealing effect is even further improved and is ensured even over the long term.

According to the invention this objective is realized in that sealing strips are provided on the end face opposite from the flange surface of the housing with recesses into which a sealant has been placed.

This sealant is distributed during the attachment of the cover, etc. both across the sealing strip, protecting its surface, and on the other hand, across the rough or uneven surface of the flange surface of the housing, penetrating into the uneven places, pores, or recesses of the flange surface, thus filling them.

In order to improve this distribution of the sealant, a further characteristic of the invention suggests that the sealing strips on the end face is provided with a profile that brings about a transport of the sealant to certain surfaces. According to another characteristic of the invention, it is preferably suggested that the sealing strips, in order to form the recesses, are designed on the end face with a saw tooth-like profile with at least one angled side flank. With the help of this measure, the wedging action causes the sealant to be pushed into the correct direction during the attachment of the cover, so that the uneven places of the flange surfaces are filled.

According to further characteristics of the invention, the sealant can be a material that starts to flow or changes to a flowable state under the influence of the pressure exerted when the cover is attached. It is preferred that wax, sealing lacquer, or similar substances are used.

According to the invention, therefore, not only are the macro-irregularities of the housing and flange surfaces elastically filled and sealed by the elastomer material of the sealing strips, but micro-roughnesses, step transitions, pores, etc. are also filled and sealed by the plastically deformable sealant.

The invention, which is described below in more detail in reference to exemplary embodiments, therefore enables on the one hand a significant improvement of the sealing effect, while on the other hand an accurate finishing of the flange surfaces is no longer necessary, so that manufacturing and finishing costs can be reduced in a not insignificant manner.

BRIEF DESCRIPTION OF THE DRAWING FIGURES

The invention is illustrated with the help of exemplary embodiments in the drawing, and is described in more detail below.

DETAILED DESCRIPTION OF THE INVENTION

Figure 1:
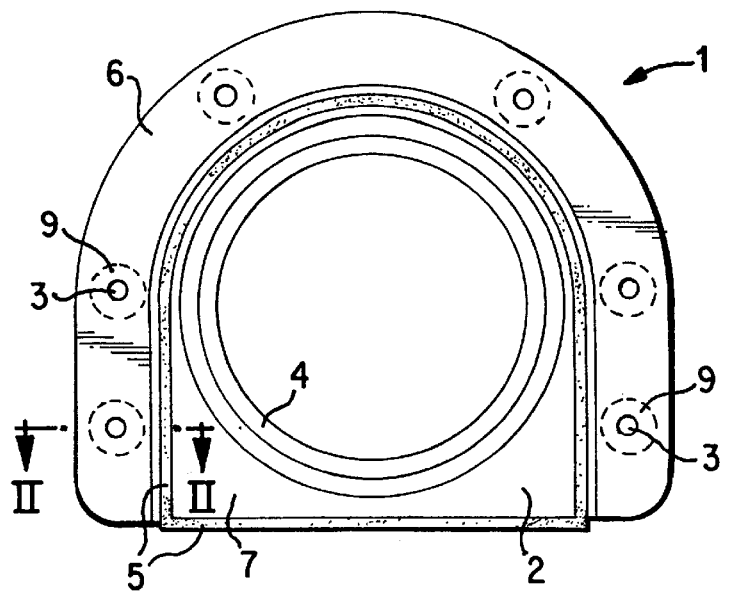
FIG. 1 shows the front view of a housing cover according to the invention.

The housing cover 1 shown in FIG. 1 is used to seal a crankshaft housing of the combustion engine of a motor vehicle. The housing cover 1 consists of a profile-drawn sheet-metal body 2 with an essentially bowl-shaped cross section and radial surfaces 6, 7 axially offset relative to each other (FIG. 2), whereby the bottom surface 6 of the sheet metal body 2 has screw through-bores 3 for connection with the crankshaft housing 8, and the radial surface 7 is used to hold a statically acting sealing strip 5. A lip seal 4 is attached to the sheet metal body 2 by vulcanization for sealing the crankshaft (not shown).

Figure 2:
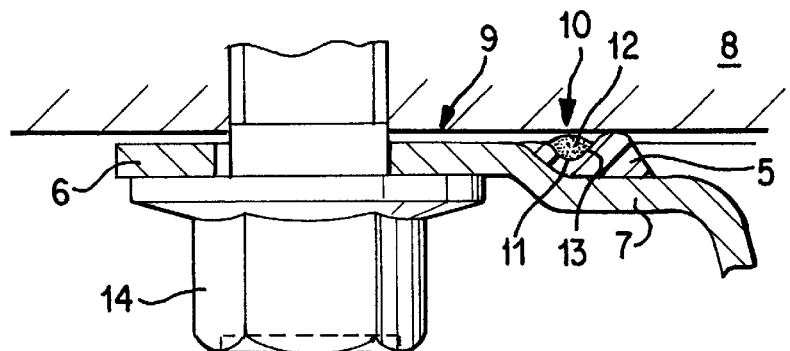
FIG. 2 shows the lateral view according to section II—II before the attachment screws are tightened.

As can be seen in FIG. 2, the sealing strip 5 is provided with a profile at the end face 10 opposite from the flange surface 9 of the crankshaft housing 8 in such a way that a recess 11 for holding a sealant 12 is created. One side flank 13 of the recess 11 in the sealing strip 5 is constructed at an angle. When the attachment screw 14 is tightened, the sealing strip 5 is deformed. The angled side flank 13 of the recess 11 causes the sealant 12 to flow, both along the side flank 13 and in the direction towards the attachment screw 14, so that the entire space between the radial surface 6 and the sealing strip 5, as well as the flange surface 9 of the crankshaft housing is filled.

Figure 3:
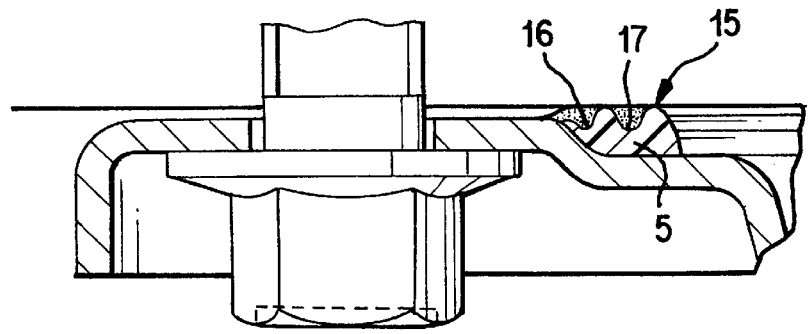
FIG. 3 shows the lateral view according to section II—II, but with a modified design of the sealing strip.

In the exemplary embodiment according to FIG. 3, the sealing strip 5 is provided with a saw-tooth-shaped profile 15. The individual recesses 16, 17 are filled with sealant 12.

What is claimed is:

1. A housing cover for sealing a crankshaft housing which possesses a flange surface comprising a metal body having an end face adapted to face the flange surface on the crankshaft housing, the end face of the metal body including axially offset first and second radial surfaces, the first radial surface of the metal body being located radially outwardly of the second radial surface, the metal body being provided with a plurality of holes for receiving attachment screws for attaching the housing cover to the crankshaft housing, said holes being provided in the first radial surface of the metal body, a lip seal attached to the second radial surface of the metal body, at least one sealing strip attached to the second radial surface of the metal body, said sealing strip having an end face that is adapted to face the flange surface on the crankshaft housing, the end face of the sealing strip having a profile defining at least one recess in the sealing strip, and a sealant provided in the at least one recess, the profile of the sealing strip effecting transport of the sealant towards the holes.

2. The housing cover according to claim 1, wherein the end face of the sealing strip is provided with a saw tooth shaped profile with at least one angled side flank.

3. The housing cover according to claim 1, wherein the sealant is a material that changes to a flowable state under influence of pressure.

4. The housing cover according to claim 1, wherein the sealant is wax.

5. The housing cover according to claim 1, wherein the sealant is a sealing lacquer.

6. The housing cover according to claim 1, wherein the end face of the sealing strip includes a plurality of recesses, each recess containing a sealant.

7. The housing cover according to claim 6, wherein the sealant in each recess is a material that changes to a flowable state under influence of pressure.

8. The housing cover according to claim 6, wherein the sealant in each recess is wax.

9. The housing cover according to claim 6, wherein the sealant in each recess is a sealing lacquer.

10. A housing cover for sealing a crankshaft housing which possesses a flange surface comprising a metal body having an end face adapted to face the flange surface on the crankshaft housing, the metal body being provided with a plurality of holes for receiving attachment screws for attaching the housing cover to the crankshaft housing, at least one sealing strip attached to the end face of the metal body, said sealing strip having an end face that is adapted to face the flange surface on the crankshaft housing, the end face of the sealing strip being configured to define at least one recess in the sealing strip, and a sealant provided in the at least one recess.

11. The housing cover according to claim 10, wherein the end face of the sealing strip is provided with a saw tooth shaped profile with at least one angled side flank.

12. The housing cover according to claim 10, wherein the sealant is a material that changes to a flowable state under influence of pressure.

13. The housing cover according to claim 10, wherein the sealant is wax.

14. The housing cover according to claim 10, wherein the sealant is a sealing lacquer.

15. The housing cover according to claim 10, wherein the end face of the sealing strip includes a plurality of recesses, each recess containing a sealant.

16. The housing cover according to claim 15, wherein the sealant in each recess is a material that changes to a flowable state under influence of pressure.

17. The housing cover according to claim 15, wherein the sealant in each recess is wax.

18. The housing cover according to claim 15, wherein the sealant in each recess is a sealing lacquer.

19. The housing cover according to claim 10, wherein the end face of the metal body includes first and second radial surfaces that are axially offset from one another, the first radial surface being positioned radially outwardly of the second radial surface, said holes being provided in the metal body at the first radial surface and the seal being attached to the second radial surface.

20. A housing cover for sealing a crankshaft housing which possesses a flange surface comprising a metal body having an end face adapted to face the flange surface on the crankshaft housing, the metal body being provided with a plurality of holes for receiving attachment screws for attaching the housing cover to the crankshaft housing, at least one sealing strip attached to the end face of a metal body, said sealing strip having an end face that is adapted to face the flange surface on the crankshaft housing, the end face of the sealing strip being configured to define at least one recess in the sealing strip, and a sealant provided in the at least one recess, wherein the sealant is a material that changes to a flowable state under influence of pressure.

* * * * *